United States Patent
Caprioli et al.

(10) Patent No.: US 7,689,813 B2
(45) Date of Patent: Mar. 30, 2010

(54) METHOD AND APPARATUS FOR ENFORCING MEMBAR INSTRUCTION SEMANTICS IN AN EXECUTE-AHEAD PROCESSOR

(75) Inventors: Paul Caprioli, Mountain View, CA (US); Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 245 days.

(21) Appl. No.: 11/083,263

(22) Filed: Mar. 16, 2005

(65) Prior Publication Data

US 2005/0273583 A1 Dec. 8, 2005

Related U.S. Application Data

(60) Provisional application No. 60/576,546, filed on Jun. 2, 2004.

(51) Int. Cl.
G06F 9/30 (2006.01)
G06F 9/40 (2006.01)
(52) U.S. Cl. ........................ 712/219; 712/216
(58) Field of Classification Search .................. 712/245, 712/216, 219
See application file for complete search history.

(56) References Cited

U.S. PATENT DOCUMENTS

| 5,666,506 | A | | 9/1997 | Hesson et al. ............... 395/392 |
| 5,904,732 | A | * | 5/1999 | Greenley et al. ............. 710/57 |
| 6,286,095 | B1 | * | 9/2001 | Morris et al. ............... 712/216 |
| 6,385,715 | B1 | * | 5/2002 | Merchant et al. ............ 712/219 |
| 6,430,649 | B1 | | 8/2002 | Chaudhry et al. ........... 711/100 |
| 6,625,660 | B1 | * | 9/2003 | Guthrie et al. .............. 709/248 |
| 6,691,220 | B1 | * | 2/2004 | Guthrie et al. ................ 712/30 |
| 6,880,073 | B2 | * | 4/2005 | Arimilli et al. .............. 712/245 |
| 7,149,851 | B1 | * | 12/2006 | Rozas et al. ................. 711/141 |
| 2006/0168432 | A1 | * | 7/2006 | Caprioli et al. ............. 712/235 |

OTHER PUBLICATIONS

Lebeck et al., A Large, Fast Instruction Window for Tolerating Cache Misses, May 2002, pp. 59-69.*
Martinez et al., Speculative Synchronization in Shared-Memory Multiprocessors, Nov. 2001, pp. 1-22.*
Multu et al., Runahead Execution: An Alternative to Very Large Instruction Windows for Out-of-order Processors, Feb. 2003, pp. 1-12.*

* cited by examiner

Primary Examiner—Eddie P Chan
Assistant Examiner—George D Giroux
(74) Attorney, Agent, or Firm—Park, Vaughan & Fleming LLP; Anthony P. Jones

(57) ABSTRACT

Embodiments of the present invention provide a system that facilitates executing a memory barrier (membar) instruction in an execute-ahead processor, wherein the membar instruction forces buffered loads and stores to complete before allowing a following instruction to be issued.

16 Claims, 5 Drawing Sheets

METHOD AND APPARATUS FOR ENFORCING MEMBAR INSTRUCTION SEMANTICS IN AN EXECUTE-AHEAD PROCESSOR

RELATED APPLICATION

This application hereby claims priority under 35 U.S.C. §119 to U.S. Provisional Patent Application No. 60/576,546 filed on 2 Jun. 2004, entitled "Method and Apparatus for Enforcing Membar Semantics in an Execute-Ahead Processor," by inventors Paul Caprioli, Shailender Chaudhry and Marc Tremblay.

BACKGROUND

1. Field of the Invention

The present invention relates to techniques for improving the performance of computer systems. More specifically, the present invention relates to a method and an apparatus for enforcing memory barrier (membar) instruction semantics in a processor during execute-ahead mode, wherein instructions that cannot be executed because of unresolved data dependencies are deferred, and other non-deferred instructions are executed in program order.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two cache or main memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that are available for register renaming purposes during out-of-order execution also limits the effective size of the issue queue.

Some processor designers have proposed entering an execute-ahead mode during processor stall conditions. In this execute-ahead mode, data dependent instructions are deferred while non-data-dependent instructions are executed in program order. For example, see U.S. patent application Ser. No. 10/686,061, filed 14 Oct. 2003, entitled "Selectively Deferring the Execution of Instructions with Unresolved Data Dependencies as They Are Issued in Program Order," by inventors Shailender Chaudhry, Marc Tremblay and Quinn A. Jacobson. By continuing to perform work during stall conditions, this technique can significantly increase the amount of work that can be completed by a processor.

Certain processors provide a type of instruction known as a memory barrier (membar) that gives programmers the ability to force a deterministic memory state on the system. For example, one common membar instruction forces a deterministic memory state by stalling the system until all buffered stores and loads are completed. Once the buffered loads and stores have completed, the processor can execute subsequent instructions with the assumption that all preceding memory references have completed. While useful and necessary, membar instructions can take an extremely long time to complete because the system may have to wait for large numbers of loads and stores to complete.

Hence, what is needed is a method and an apparatus for enforcing membar instruction semantics in an execute-ahead processor without the above-described performance problems.

SUMMARY

One embodiment of the present invention provides a system that facilitates executing a memory barrier (membar) instruction in an execute-ahead processor, wherein the membar instruction forces buffered loads and stores to complete before allowing a following instruction to be issued. During operation in a normal-execution mode, the processor issues instructions for execution in program order. Upon encountering a membar instruction, the processor determines if the load buffer and store buffer contain unresolved loads and stores. If so, the processor defers the membar instruction and executes subsequent program instructions in execute-ahead mode. In execute-ahead mode, instructions that cannot be executed because of an unresolved data dependency are deferred, and other non-deferred instructions are executed in program order. When all stores and loads that precede the membar instruction have been committed to memory from the store buffer and the load buffer, the processor enters a deferred mode and executes the deferred instructions, including the membar instruction, in program order. If all deferred instructions have been executed, the processor returns to the normal-execution mode and resumes execution from the point where the execute-ahead mode left off.

In a variation of this embodiment, deferring instructions involves storing the instruction in a deferred queue which contains deferred instructions in program order.

In a further variation, the deferred queue is a FIFO structure.

In a further variation, executing deferred instructions in the deferred mode involves issuing deferred instructions in program order. If the instructions cannot be executed because of an unresolved data dependency, they are deferred again. If the data dependencies have been resolved, the instructions are executed in program order.

In a further variation, at the end of deferred mode, if some deferred instructions were again deferred due to an unresolved data dependency, the processor returns to execute-ahead mode at the point where execute-ahead mode left off.

In a further variation, when a membar instruction is deferred, a status indicator is set to indicate that the membar instruction has been deferred.

In a further variation, the status indicator is cleared when the membar instruction completes.

In a further variation, all load and store instructions encountered by the processor in execute-ahead mode are deferred if the status indicator is set.

In a further variation, deferring a load or a store in execute-ahead mode involves generating a prefetch for the load or store.

In a further variation, while executing instructions in the execute-ahead mode, the store buffer is gated so that stores that enter the store buffer during execute-ahead mode remain in the store buffer until the processor leaves the execute-ahead mode.

In a further variation, the load buffer and the store buffer generate a signal to indicate that the buffered loads and stores that entered the load buffer and store buffer prior to the membar instruction have cleared.

In a further variation, if a non-memory-dependent stall condition occurs while the processor is in execute-ahead mode, the processor immediately goes into scout mode. In scout mode, instructions are speculatively executed to prefetch future loads, but the results of the execution are not committed to the architectural state of the processor.

In a further variation, a 'stores-after-launch' counter is initialized upon each entry to execute-ahead mode that is caused by a data-dependent stall condition other than the membar instruction. The stores-after-launch counter is then incremented with each store encountered while the processor is executing in execute-ahead mode.

In a further variation, encountering a membar instruction in execute-ahead mode when the stores-after-launch counter is non-zero causes the processor to immediately enter scout mode. In scout mode, instructions are speculatively executed to prefetch future loads, but the results of the execution are not committed to the architectural state of the processor.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1:
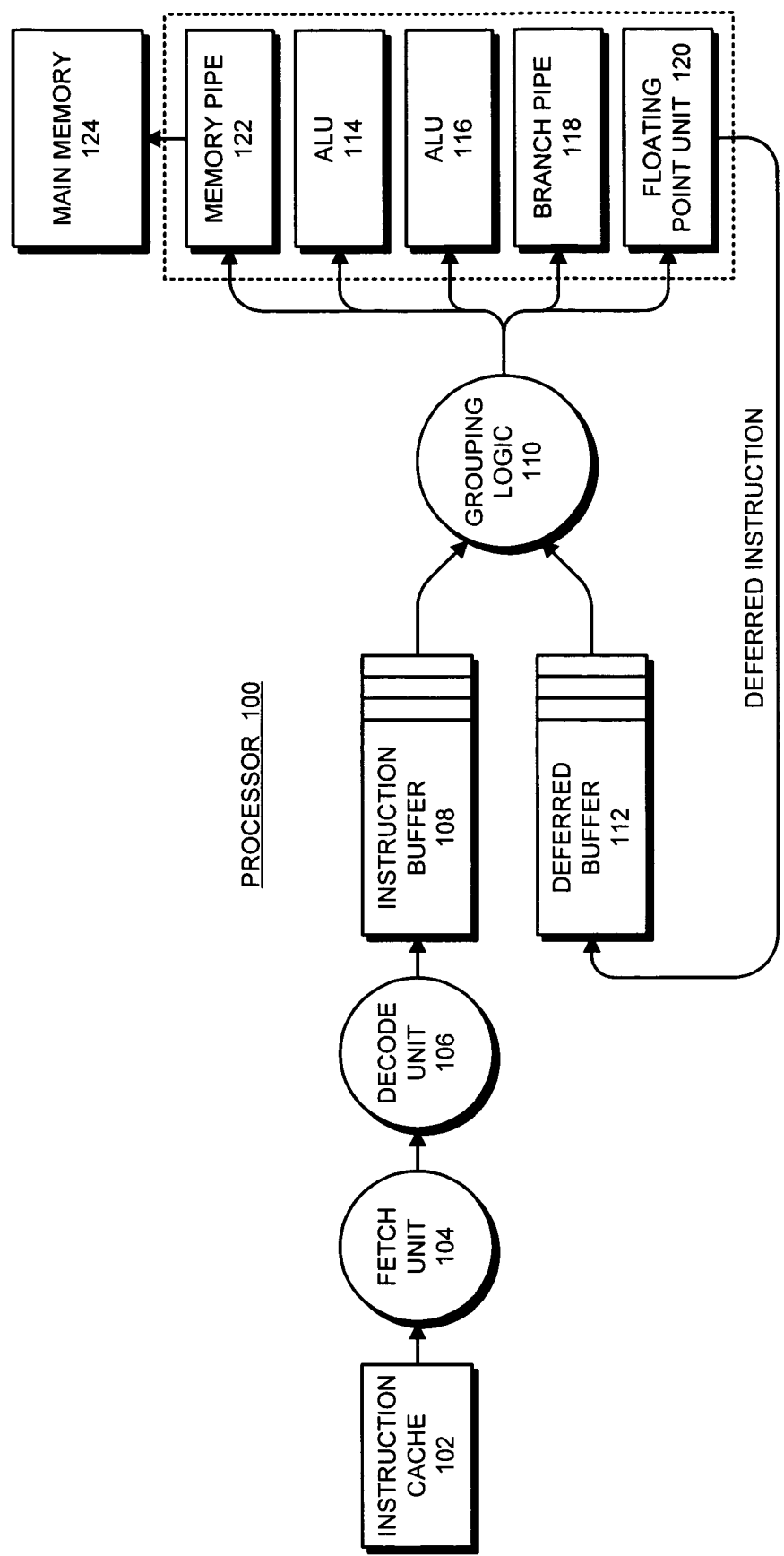
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance.

As is illustrated in FIG. 1, processor 100 includes instruction cache 102, fetch unit 104, decode unit 106, instruction buffer 108, deferred queue 112, grouping logic 110, arithmetic logic unit (ALU) 114, ALU 116, branch pipe 118, memory pipe 122, and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

Buffers

Figure 2:
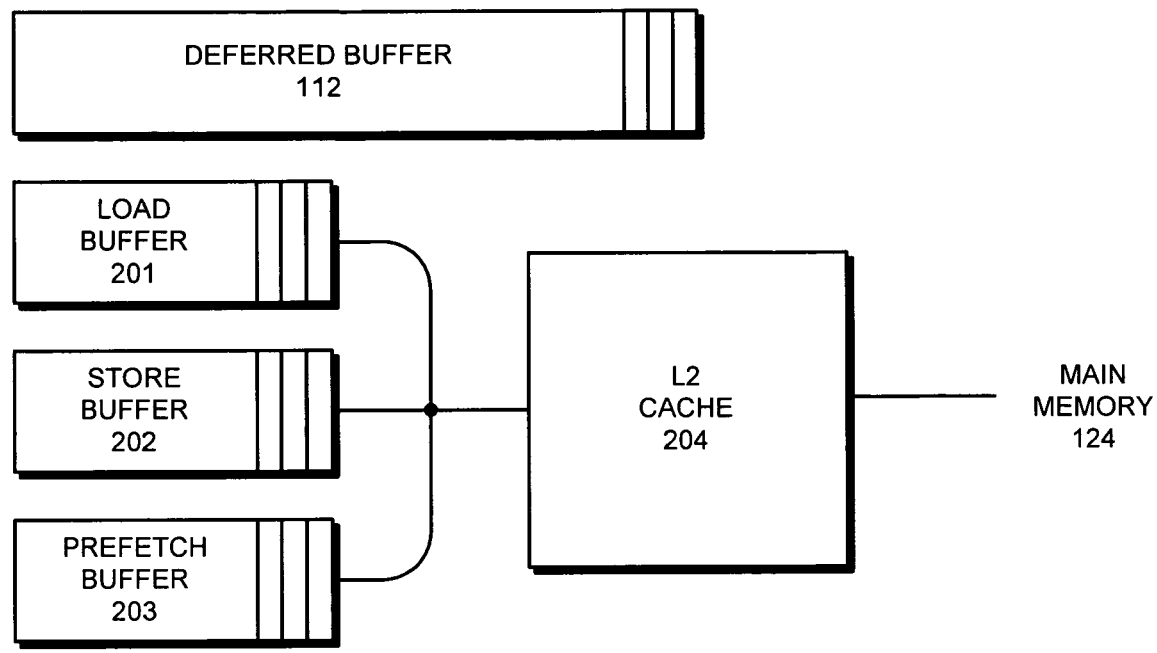
FIG. 2 illustrates various buffers within a processor in accordance with an embodiment of the present invention.

FIG. 2 illustrates various buffers within processor 100 in accordance with an embodiment of the present invention. These buffers include load buffer 201, store buffer 202 and prefetch buffer 203, which are well-known structures in existing processors. Also illustrated in FIG. 2 are a deferred queue 112 (see FIG. 1) and Level 2 (L2) cache 204.

Load buffer 201, store buffer 202 and prefetch buffer 203 hold entries for load, store and prefetch instructions that are waiting to access slower portions of the memory hierarchy, such as L2 cache 204 and possibly main memory 124.

The present invention exploits deferred queue 112 to prevent processor 100 from stalling when a membar instruction is encountered. This is accomplished by recognizing when instruction buffer 108 contains a membar instruction. When a membar instruction is encountered, processor 100 checks the status of load buffer 201 and store buffer 202 to see if those buffers contain unresolved stores and/or loads. If unresolved loads and/or stores are present in the buffers, processor 100 defers the membar instruction and inserts the membar instruction into deferred queue 112. A more complete description of this process is found below with reference to FIG. 4.

State Diagram

Figure 3:
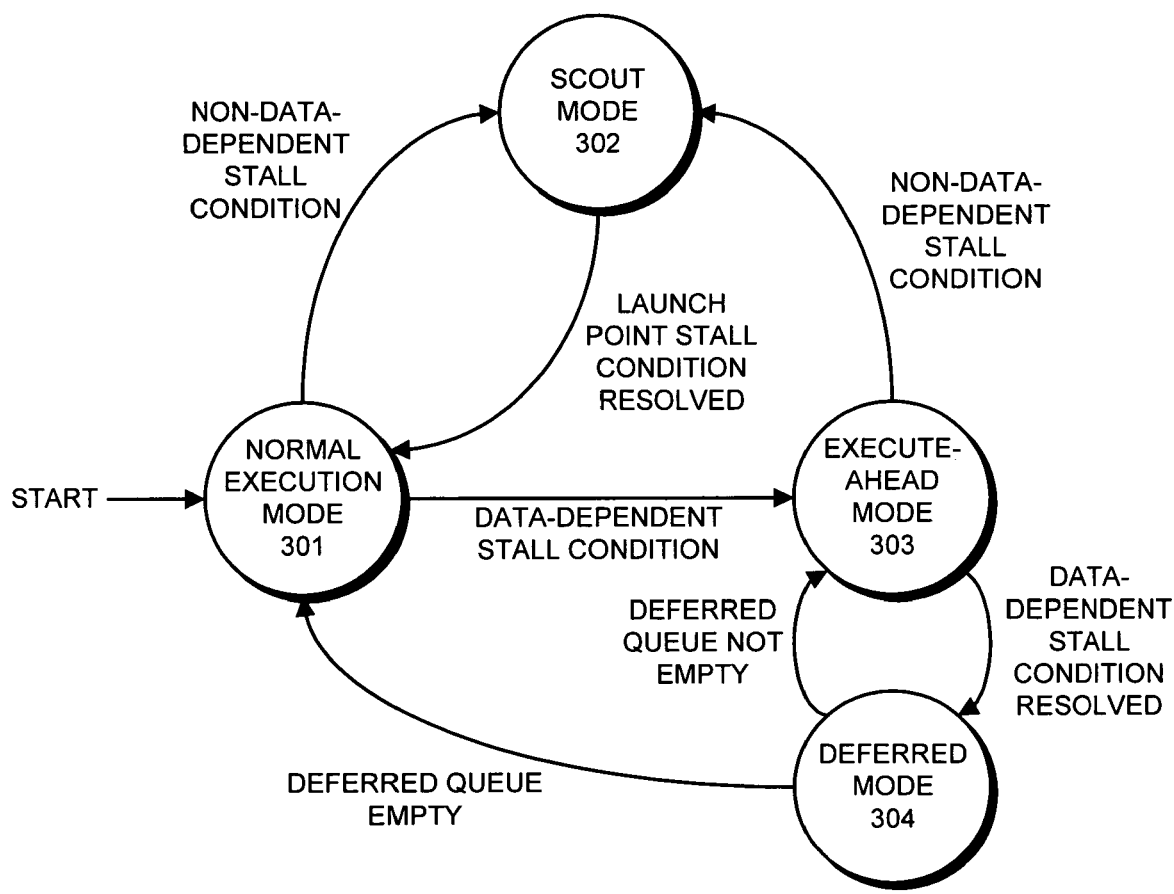
FIG. 3 presents a state diagram, which includes execute-ahead mode and scout mode, in accordance with an embodiment of the present invention.

FIG. 3 presents a state diagram which includes a general depiction of execute-ahead mode 303, scout mode 302, and deferred mode 304 in accordance with an embodiment of the present invention.

The system starts in normal-execution mode 301, wherein instructions are executed in program order as they are issued from instruction buffer 108 (see FIG. 1).

Next, if an unresolved data dependency arises during execution of an instruction, the system moves to execute-ahead mode 303. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 303, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 303 or deferred mode 304.) The system also "defers" execution of the instruction that encountered the unresolved data dependency by storing the instruction in deferred queue 112.

While operating in execute-ahead mode 303, the system continues to execute instructions in program order as they are received from instruction buffer 108, and any instructions that cannot execute because of an unresolved data dependency are deferred into deferred queue 112.

During execute-ahead mode 303, if an unresolved data dependency is finally resolved, the system moves into deferred mode 304, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instruction back into deferred queue 112. On the other hand, the system executes other instructions that can be executed in program order with respect to each other.

After the system completes a pass through deferred queue 112, if deferred queue 112 is empty, the system moves back into normal-execution mode 301. This may involve committing changes made during execute-ahead mode 303 and deferred mode 304 to the architectural state of processor 100, if such changes have not been already committed. The return to normal mode can also involve throwing away the checkpoint generated when the system moved into execute-ahead mode 303.

On the other hand, if deferred queue 112 is not empty after the system completes a pass through deferred queue 112, the system returns to execute-ahead mode 303 to execute instructions from instruction buffer 108 from the point where the execute-ahead mode 303 left off.

If a non-data dependent stall condition (except for a load buffer full or store buffer full condition) arises while the system is in normal-execution mode 301 or in execute-ahead mode 303, the system moves into scout mode 302. (This non-data-dependent stall condition can include: a memory barrier operation; or a deferred queue full condition.) In scout mode 302, instructions are speculatively executed to prefetch future loads, but results are not committed to the architectural state of processor 100.

Scout mode 302 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 302.

Unfortunately, computational operations performed during scout mode 302 need to be recomputed again, which can require a large amount of computational work.

When the original "launch point" stall condition is finally resolved, the system moves back into normal-execution mode 301, and, in doing so, uses the previously generated checkpoint to resume execution from the launch point instruction that encountered the launch point stall condition. The launch point stall condition is the stall condition that originally caused the system to move out of normal-execution mode 301. For example, the launch point stall condition can be the data-dependent stall condition that caused the system to move from normal-execution mode 301 to execute-ahead mode 303, before moving to scout mode 302. Alternatively, the launch point stall condition can be the non-data-dependent stall condition that caused the system to move directly from normal-execution mode 301 to scout mode 302.

Membar Instruction Encountered in Normal-Execution Mode

Figure 4:
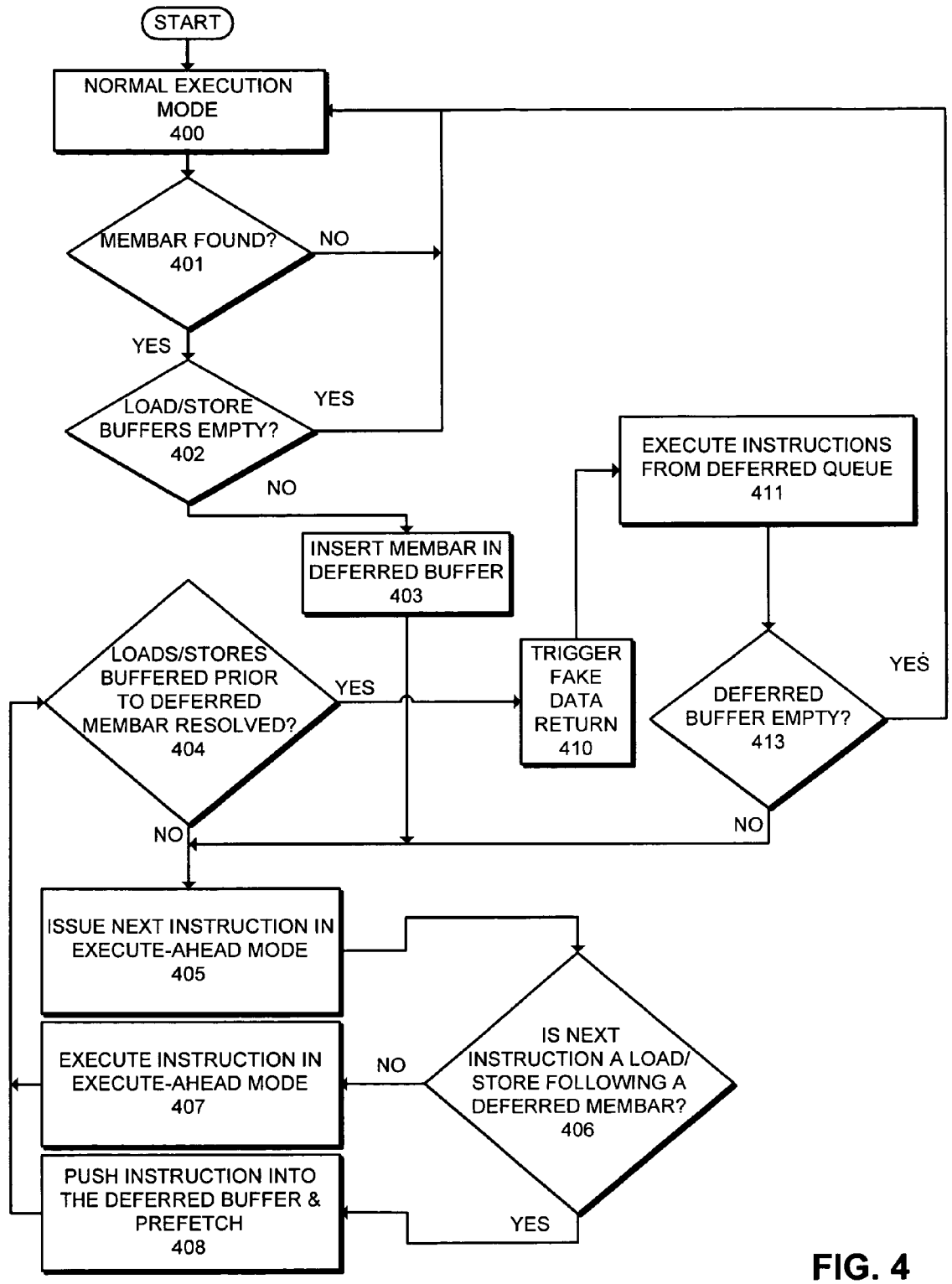
FIG. 4 presents a flow chart illustrating how a membar instruction is handled when encountered in normal-execution mode in accordance with an embodiment of the present invention.

FIG. 4 presents a flow chart illustrating how a membar instruction is handled in normal-execution mode in accordance with an embodiment of the present invention. The discussion centers on a processor 100, which follows the same transitions of the diagram presented in FIG. 3. Referring to FIG. 3, the membar instruction creates a data-dependent stall condition when processor 100 encounters the membar instruction in normal-execution mode.

Note that the membar instruction forces the system to clear preceding buffered memory operations, such as loads and stores, before proceeding to the next instruction in program order. In a conventional processor, a membar instruction simply stalls the processor until the buffers have cleared.

Note that different instructions similar to the membar instruction in their effect on processor 100 could be handled in the same fashion as the membar instruction.

During operation, the system starts in normal-execution mode (step 400), wherein instructions are executed in program order as they are issued from instruction buffer 108 (see FIG. 1). At some time during program execution, processor 100 detects a membar instruction as the membar instruction is issued (step 401). When the membar instruction is detected, the system checks load buffer 201 (see FIG. 2) and store buffer 202 to see if the buffers contain unresolved memory operations (step 402). If there are not, the membar is immediately issued. Note that with the buffers clear, the membar instruction is executed as if it was a noop, without forcing processor 100 to stall. Processor 100 then proceeds to the next instruction in program order in normal-execution mode (step 400).

Otherwise, if load buffer 201 and store buffer 202 contain unresolved stores and/or loads, processor 100 inserts the membar into deferred queue 112 (step 403) and begins execution in execute-ahead mode (step 405).

Because the membar instruction guarantees that all preceding memory operations have been completed, serious errors may occur if load and store instructions following the deferred membar are allowed to complete before the membar completes. Therefore, the processor defers all subsequent loads and stores following the deferral of a membar instruction. To ensure that subsequent loads and stores are deferred, a status indicator is set informing the system that the membar has been deferred.

If the next issued instruction is not a load or a store, processor 100 executes the instruction in execute-ahead mode (step 407).

Alternatively, if the next issued instruction is a load or store (step 406) and if the membar deferral status indicator is set, processor 100 defers the instruction and performs a prefetch of the load or store (step 408).

While executing subsequent instructions following the deferral of a membar, the load and store buffer controller monitors the loads and stores that entered the load and store buffers prior to the deferral of the membar; when the loads and stores have been resolved (step 404), the system triggers a fake data return, which causes processor 100 to enter deferred mode (step 410). While the loads and stores buffered prior to the deferral of the membar have not yet been resolved, the processor continues to issue instructions in execute-ahead mode (step 405).

In deferred mode 304, the membar is the first instruction issued from the deferred queue. Following the membar, the system continues to execute instructions from the deferred queue 112 (step 411). In doing so, the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instruction back into deferred queue 112. On the other hand, the system executes other instructions that can be executed in program order with respect to each other.

Once a complete pass has been made through deferred queue 112, processor 100 queries deferred queue 112 to determine whether deferred queue 112 still contains deferred instructions which could not complete due to an unresolved data dependency. If deferred queue 112 is not empty (step 413), processor 100 returns to execute-ahead mode (step 405). If deferred queue 112 is empty (step 413), processor 100 returns to normal-execution mode (step 400).

Membar Instruction Encountered in Execute-Ahead Mode

Figure 5:
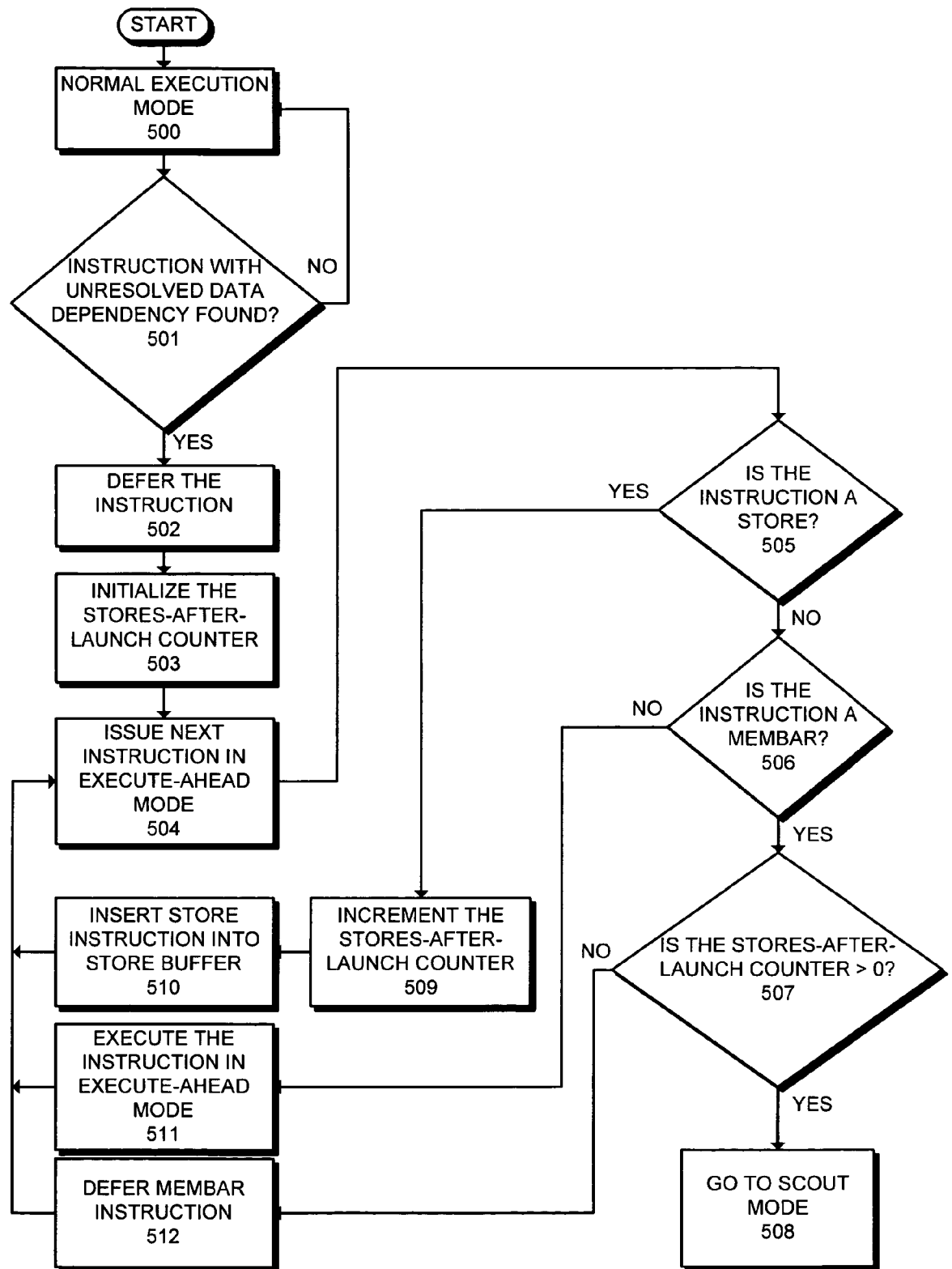
FIG. 5 presents a flow chart illustrating how a membar instruction is handled when encountered during execute-ahead mode in accordance with an embodiment of the present invention.

FIG. 5 presents a flow chart illustrating how a membar instruction is handled in speculative execution mode in accordance with an embodiment of the present invention. The discussion centers on processor 100 (from FIG. 1), which follows the same transitions of the diagram presented in FIG. 3.

Processor 100 starts in normal-execution mode, wherein instructions are executed in program order as they are issued from instruction buffer 108 (see FIG. 1) (step 500).

Upon encountering the instruction with an unresolved data dependency (step 501), processor 100 defers the instruction (step 502). Processor 100 then begins to issue instructions in program order in execute-ahead mode (step 504). An unresolved data dependency can, for example, be caused by a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; or a use of an operand that depends on another operand that is subject to an unresolved data dependency.

When processor 100 enters execute-ahead mode, stores are written to the store buffer as they are during normal execution. The mechanism for managing the writing of stores to the store buffer in execute-ahead mode is described in detail in a provisional U.S. patent application entitled, "Entering Scout Mode when Stores Encountered During Execute-Ahead Mode Exceed the Capacity of the Store Buffer," by inventors Shailender Chaudhry, Marc Tremblay, and Paul Caprioli having Ser. No. 60/562,856, and filing date of Apr. 26, 2004, which is hereby incorporated by reference to describe implementation details of scout mode (step 508).

In execute-ahead mode the store buffer is gated so that none of the stores buffered during execute-ahead mode leave the store buffer until processor 100 returns to normal-execution mode.

Before entering execute-ahead mode, processor 100 initializes a 'stores-after-launch' counter (step 503). This counter is dedicated to recording the number of stores that have been buffered following the entry to execute-ahead mode.

Processor 100 monitors the instructions as they are issued in execute-ahead mode. If the instruction is a store instruction (step 505), processor 100 increments the stores-after-launch counter (step 509) and inserts the store instruction into the store buffer (step 510).

If the instruction is not a store (step 505) and not a membar (step 506), the instruction is executed (step 511) and processor 100 issues the next instruction in execute-ahead mode (step 504). Note that this may involve deferring the instruction if the instruction is subject to an unresolved data dependency.

If the instruction is a membar (step 506) and the stores-after-launch counter is zero (step 507), the membar is deferred (step 512) and processor 100 continues to issue instructions in execute-ahead mode (step 504).

Alternatively, if the membar is encountered and the stores-after-launch counter is greater than zero (step 507), as occurs when stores have been buffered after the entry to execute-ahead mode, processor 100 immediately goes to scout mode (step 508).

Processor 100 immediately goes to scout mode (step 508) to avoid a potential blockage problem. This blockage arises because, when the store buffer is gated in execute-ahead mode, the store buffer cannot clear store instructions buffered after the entry to execute-ahead mode until processor 100 returns to normal-execution mode. The membar instruction cannot be issued from the deferred queue until the store buffer is cleared of all stores buffered prior to the deferral of the membar, including those that may be gated during execute-ahead mode. This results in a deadlock condition: the membar prevents the store buffer from clearing, while the store buffer containing unresolved store instructions prevents the membar from issuing.

Because processor 100 defers all subsequent store instructions once the membar is deferred, the blockage will eventually be resolved because the deferral of stores continues until processor 100 overflows the deferred queue. When the deferred queue overflows, processor 100 automatically enters scout mode, thereby ending the blockage. By using the stores-after-launch counter to recognize this block when it occurs, processor 100 enters scout mode (step 508) early and avoids the time spent waiting for the deferred queue to overflow.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for executing a membar instruction in an execute-ahead processor, wherein the membar instruction forces buffered loads and stores to complete before allowing any following loads or stores to complete, comprising:
   a processor;
   an execution mechanism within the processor configured to issue instructions for execution in a normal-execution mode, and further configured to enter an execute-ahead mode if, while issuing instructions for execution in the normal-execution mode, an instruction cannot be executed because of an unresolved data dependency;
   wherein while issuing instructions for execution in the execute-ahead mode, instructions that cannot be executed because of an unresolved data dependency are deferred by placing the instructions in a deferred queue, and non-deferred instructions are executed in program order;
   wherein, upon encountering a membar instruction while issuing instructions for execution in the normal-execution mode, the execution mechanism is configured to determine if either a load buffer or a store buffer is non-empty and, if so, the execution mechanism is further configured to:
      defer the membar instruction by placing the membar instruction in the deferred queue;
      execute subsequent instructions in the execute-ahead mode; and
      defer all load and store instructions encountered by the execution mechanism in execute-ahead mode after deferring the membar instruction by placing these instructions in the deferred queue in program order following the membar instruction; and
   wherein the execution mechanism is configured to initialize a stores-after-launch counter upon each entry to execute-ahead mode that is caused by an unresolved data dependency other than the membar instruction, wherein the stores-after-launch counter is incremented for each store encountered while the processor is executing in execute-ahead mode, and wherein the stores-after-launch counter is not decremented after the stores-after-launch counter is initialized upon each entry to execute-ahead mode that is caused by an unresolved data dependency other than the membar instruction;
   when all stores and loads that precede the membar instruction have been committed to memory from the store buffer and the load buffer, the execution mechanism is configured to enter a deferred mode, wherein the execution mechanism executes the deferred instructions including the membar instruction; and
   if all deferred instructions are executed in the deferred mode, the mechanism is configured to return to the normal-execution mode to resume normal program execution from the point where the execute-ahead mode left off.

2. The apparatus of claim 1, wherein the deferred queue is a FIFO structure.

3. The apparatus of claim 2, wherein the execution mechanism is configured such that executing deferred instructions in the deferred mode involves:
   issuing deferred instructions for execution in program order from the deferred queue;
   deferring execution of deferred instructions that still cannot be executed because of unresolved data dependencies by placing these instructions in the deferred queue in program order; and
   executing other deferred instructions that are able to be executed in program order.

4. The apparatus of claim 3, wherein at the end of deferred mode, the execution mechanism is configured such that if some deferred instructions are deferred again, the execution mechanism returns to execute-ahead mode at the point where execute-ahead mode left off.

5. The apparatus of claim 1, wherein when the membar instruction is deferred, a status indicator is set to tell the processor that the membar instruction has been deferred.

6. The apparatus of claim 5, wherein the status indicator is cleared when the membar instruction completes.

7. The apparatus of claim 5, wherein deferring a load or a store in execute-ahead mode involves generating a prefetch for the load or store.

8. The apparatus of claim 1, wherein the execution mechanism is configured such that while executing instructions in the execute-ahead mode, the store buffer is gated so that stores that enter the store buffer during execute-ahead mode remain in the store buffer until the execution mechanism leaves the execute-ahead mode.

9. The apparatus of claim 1, wherein the load buffer and the store buffer generate a signal to indicate that the buffered loads and stores that entered the load buffer and store buffer prior to the membar instruction have cleared.

10. The apparatus of claim 1, wherein if a non-memory-dependent stall condition occurs while the processor is in execute-ahead mode, the execution mechanism is configured such that it immediately enters a scout mode wherein instructions are speculatively executed to prefetch future loads, but wherein results are not committed to the architectural state of the processor.

11. The apparatus of claim 1, wherein the execution mechanism is configured such that if the membar instruction is encountered in execute-ahead mode when the stores-after-launch counter is non-zero, the execution mechanism immediately enters a scout mode, wherein instructions are speculatively executed to prefetch future loads, but wherein results are not committed to the architectural state of the processor.

12. A computer system for executing a membar instruction in an execute-ahead processor, wherein the membar instruction forces buffered loads and stores to complete before allowing any following loads or stores to complete, comprising:
   a processor;
   a memory;
   an execution mechanism within the processor configured to issue instructions for execution in a normal-execution mode, and further configured to enter an execute-ahead mode if, while issuing instructions for execution in the normal-execution mode, an instruction cannot be executed because of an unresolved data dependency;
   wherein while issuing instructions for execution in the execute-ahead mode, instructions that cannot be executed because of an unresolved data dependency are deferred by placing the instructions in a deferred queue, and non-deferred instructions are executed in program order;
   wherein, upon encountering a membar instruction while issuing instructions for execution in the normal-execution mode, the execution mechanism is configured to determine if either a load buffer or a store buffer is non-empty and, if so, the execution mechanism is configured to:
      defer the membar instruction by placing the membar instruction in the deferred queue;

execute subsequent instructions in the execute-ahead mode; and defer all load and store instructions encountered by the execution mechanism in execute-ahead mode after deferring the membar instruction by placing these instructions in the deferred queue in program order following the membar instruction; and wherein the execution mechanism is configured to initialize a stores-after-launch counter upon each entry to execute-ahead mode that is caused by an unresolved data dependency other than the membar instruction, wherein the stores-after-launch counter is incremented for each store encountered while the processor is executing in execute-ahead mode, and wherein the stores-after-launch counter is not decremented after the stores-after-launch counter is initialized upon each entry to execute-ahead mode that is caused by an unresolved data dependency other than the membar instruction;

when all stores and loads that precede the membar instruction have been committed to memory from the store buffer and the load buffer, the execution mechanism is configured to enter a deferred mode, wherein the execution mechanism executes the deferred instructions including the membar instruction; and if all deferred instructions are executed in the deferred mode, the mechanism is configured to return to the normal-execution mode to resume normal program execution from the point where the execute-ahead mode left off.

13. A method for executing a membar instruction in an execute-ahead processor, wherein the membar instruction forces buffered loads and stores to complete before allowing any following loads or stores to complete, comprising:

issuing instructions for execution in a normal-execution mode;

if, while issuing instructions for execution in the normal-execution mode, an instruction cannot be executed because of an unresolved data dependency, entering an execute-ahead mode, wherein instructions that cannot be executed because of an unresolved data dependency are deferred by placing the instructions in a deferred queue, and wherein non-deferred instructions are executed in program order;

upon encountering a membar instruction while issuing instructions for execution in the normal-execution mode, determining if either a load buffer or a store buffer is non-empty and, if so, deferring the membar instruction by placing the membar instruction in the deferred queue and executing subsequent instructions in the execute-ahead mode;

deferring all load and store instructions encountered by the execution mechanism in execute-ahead mode after deferring the membar instruction by placing these instructions in the deferred queue in program order following the membar instruction;

initializing a stores-after-launch counter upon each entry to execute-ahead mode that is caused by an unresolved data dependency other than the membar instruction;

incrementing the stores-after-launch counter for each store encountered while the processor is executing in execute-ahead mode;

when all stores and loads that precede the membar instruction have been committed to memory from the store buffer and the load buffer during the execute-ahead mode, entering a deferred mode, wherein the processor executes the deferred instructions including the membar instruction; and if all deferred instructions are executed in deferred mode, returning to the normal-execution mode to resume normal program execution from the point where the execute-ahead mode left off;

wherein the stores-after-launch counter is not decremented after the stores-after-launch counter is initialized upon each entry to execute-ahead mode that is caused by an unresolved data dependency other than the membar instruction.

14. The method of claim 13, wherein the deferred queue is a FIFO structure.

15. The method of claim 13, wherein executing deferred instructions in the deferred mode involves:

issuing deferred instructions for execution in program order from the deferred queue;

deferring execution of deferred instructions that still cannot be executed because of unresolved data dependencies by placing these instructions in the deferred queue in program order; and executing other deferred instructions that are able to be executed in program order.

16. The method of claim 15, wherein at the end of deferred mode, if some deferred instructions are deferred again, the method further comprises returning to execute-ahead mode at the point where execute-ahead mode left off.

* * * * *